Feb. 10, 1970 SVEN-PETER MANNSFELD ET AL 3,494,958
PRODUCTON OF MONOMERIC CLEVAGE PRODUCTS BY THERMAL
DECOMPOSITION OF POLYMERS
Filed Feb. 2, 1967
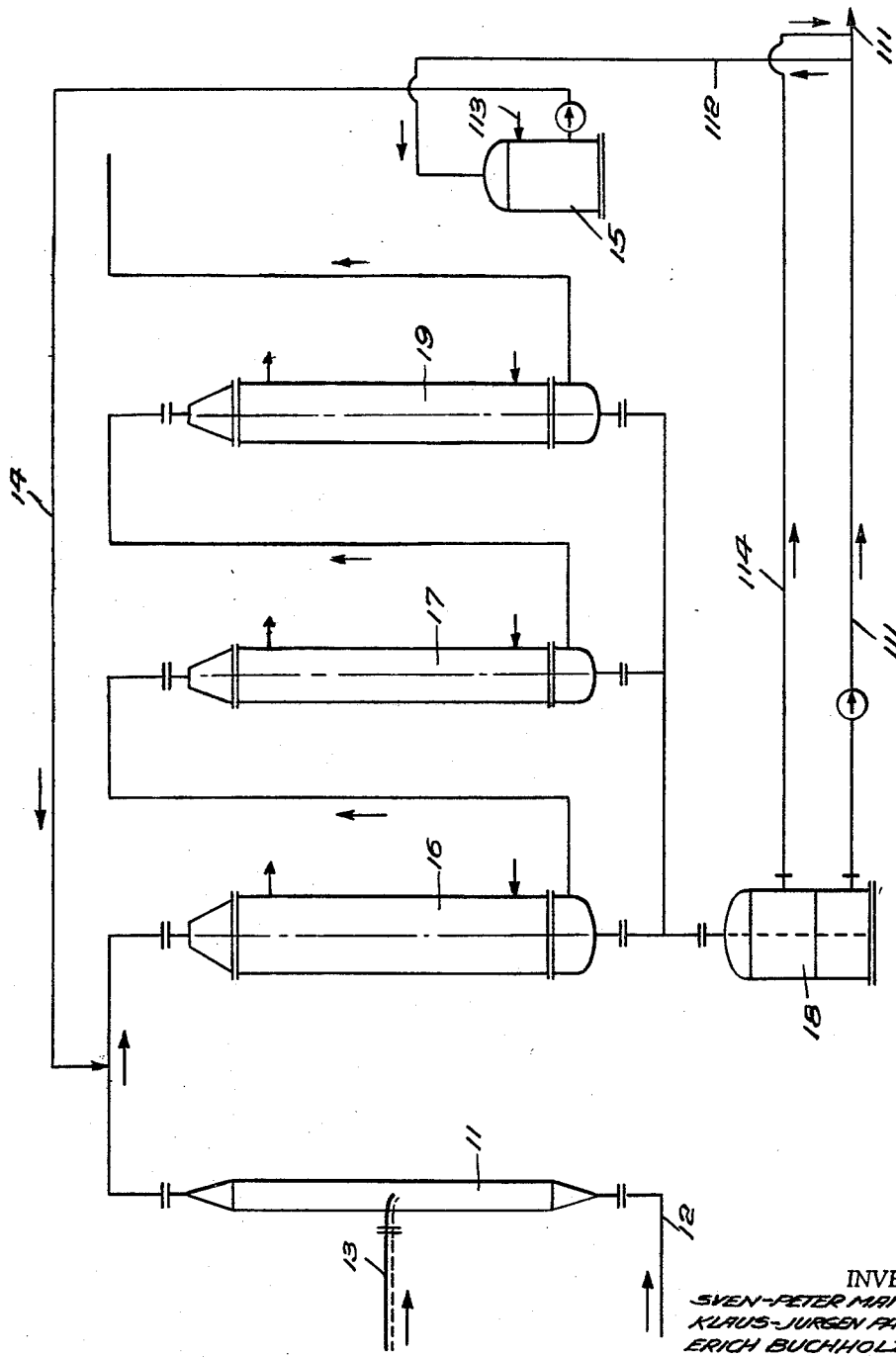
INVENTORS
SVEN-PETER MANNSFELD,
KLAUS-JURGEN PAULSEN,
ERICH BUCHHOLZ,
BY Bailey, Stephens & Huettig
ATTORNEYS 3,494,958
PRODUCTION OF MONOMERIC CLEAVAGE PRODUCTS BY THERMAL DECOMPOSITION OF POLYMERS
Sven-Peter Mannsfeld and Klaus-Jürgen Paulsen, Brühl, and Erich Buchholz, Wesseling, Germany, assignors to Deutsche Gold- und Silber-Scheideanstalt vormals Roessler, Frankfurt am Main, Germany
Filed Feb. 2, 1967, Ser. No. 613,543
Claims priority, application Germany, Feb. 5, 1966, D 49,295
Int. Cl. C07c *67/00, 67/06, 69/51*
U.S. Cl. 260—486     9 Claims

ABSTRACT OF THE DISCLOSURE

A process for the thermal decomposition of polymers, especially, polymethyl methacrylate, in which a finely divided polymer of a grain size less than 5 mm. is wind sifted and pyrolysed at a temperature which is at least 100° C. over and, preferably, about 300 to 500° C. over the depolymerization temperature to produce a monomeric product of high purity in good yields.

BACKGROUND OF THE INVENTION

The invention relates to an improved process for the thermal decomposition of polymers for the production of monomeric cleavage products.

A number of processes are known for the recovery of monomeric cleavage products by the thermal decomposition of polymers. These processes differ from each other, essentially, in the manner in which heat transfer is effected, the polymer is introduced and the cleavage product is recovered, as well as the aggregate state of the conduct of the reaction.

For example, a process is known in which a polymethyl methacrylate melt is treated in an externally heated cleavage column at 350 to 400° C. with steam of the same temperature. In such process, the polymethyl methacrylate is supplied discontinuously in the form of pieces (Trude Khim. i. Khim. Technol. 1, 426–30, 1958).

It is of disadvantage, in the known processes, that active polymerizable pyrolysis products are formed and that coke deposits are formed which hinder production. In view of these undesired side reactions numerous interruptions become necessary in the process in order to free the depolymerization apparatus from the coke which is produced. The by-products produced not only lower the monomeric yield, but also lead to an increased tendency for repolymerization which renders it necessary to process the crude depolymerization product rapidly and also to reuse the pure depolymerization product as soon as possible.

SUMMARY OF THE INVENTION

According to the invention it was unexpectedly found that polymers could be decomposed while avoiding production hindering deposits of coke to give large yields of monomeric cleavage products with high purity and low tendency to repolymerize, when the polymers, in finely ground form, are wind sifted and pyrolysed at a temperature which is at least 100° C., preferably, 300–500° C. over the depolymerization temperature of the polymers.

According to the invention the polymer is comminuted and ground prior to its pyrolytic cleavage. The grain size of the polymer should at most be 6 mm. and in order to be able to effect a rapid uniform cleavage it is preferable that the grain size be below 1.5 mm. The grain size used depends upon the technical possibilities of the grinding process employed. The process is applicable to all polymers which can be comminuted to the necessary small grain size, and be wind sifted and pyrolysed. It, however, is particularly suited for the treatment of polymers which, as monomers, have a bond system capable of conjugation as in polybutadienes, polystyrenes, polyformaldehydes and, preferably, polymethyl methacrylates.

The finely divided ground polymer advantageously can be introduced into the reaction space, for instance, wind sifting tube, with the aid of a carrier material which can be a liquid, especially, those having a low heat of vaporization, such as, halohydrocarbons or also water, but, preferably, in an inert gaseous substance, such as, nitrogen which is gaseous at room temperature.

It is especially advantageous for the process according to the invention to convey the finely divided polymers which are to be pyrolysed pneumatically under pressure which renders it possible to use a finely divided polymer to carrier gas ratio of 1:1 to 1:40, especially, 1:10 to 1:30.

In addition, a gas is caused to flow through the reaction space to effect the necessary wind sifting and simultaneously act as a heat transfer agent to provide the heat for the pyrolysis.

The heat transfer gas in this embodiment of the invention is heated to the temperature employed for cleavage of the polymer and therefore should be at least 100° C. and, preferably, 300° C. to 500° C. over the depolymerization temperature of the polymer. Vapors of liquids or gases such as nitrogen come into question as the heat transfer agent. They can be produced with an acid or alkaline reaction which may be favorable for the cleavage by the injection of acids or bases. The use of superheated steam as heat transfer agent is especially advantageous as, on one hand, most cleavage products have an optimal volatility therein and, on the other hand, the recovery of the cleavage products, by condensation, is simplified.

The conditions are so selected, according to the principles of wind sifting, that cleavage of the smaller particles occurs at lower temperatures and of the larger particles at higher temperatures.

The process according to the invention, for example, can be carried out by injecting the finely ground polymer together with a carrier gas as an inert liquid into the reaction space through which the gaseous heat transfer agent flows, preferably, countercurrent, in such a way that the velocity of the injected polymer is 2 to 50 times the velocity of the gaseous heat transfer agent. The flow velocity of the gaseous heat transfer agent in general does not exceed 1 to 10 m./sec.

The gas resulting from the cleavage is first quenched and stabilized with a solution of a polymerization inhibitor and then condensed in a cooling system. The subsequent processing to a pure depolymerization product can be effected by usual known procedures, such as, for example, by steam distillation and fractionation of the monomer phase.

The process according to the invention can be carried out continuously as the undesired deposit of coke does not occur. A further advantage of the process is the rather simple and automatically regulatable manner in which it can be carried out with the production of high purity monomer in high yields as has already been mentioned.

BRIEF DESCRIPTION OF THE DRAWING

The accompanying drawing diagrammatically shows an apparatus suitable for carrying out the process according to the invention.

DESCRIPTION OF THE PREFERRED EMBODIMENT

The following example will serve to illustrate the process according to the invention with reference to an apparatus according to the drawing.

Example

Polymethyl methacrylate was comminuted and ground to a particle size of less than 1.5 mm.

A cleavage column 11, 3200 mm. long and 200 m. in diameter, was provided and 120 kg./h. of steam at a temperature of 790° C. continuously introduced into the bottom thereof through conduit 12.

A solids/gaseous mixture of 50 kg./h. of the ground polymethyl methacrylate and 4 kg./h. of nitrogen was continuously introduced downwardly into the cleavage column 11 through injection tube 13 about 1400 mm. over the hot steam inlet at a velocity of about 45 m./sec.

The cleavage of the larger polymethyl methacrylate particles primarily occurred at temperatures of 550–790° C. in the lower regions of the cleavage column and the cleavage of the finer particles occurred in the upper regions of the cleavage column at 400–550° C. because of the wind sifting action occurring therein.

The gaseous cleavage product leaving the upper end of column 11 in addition to steam, nitrogen and methyl methacrylate contained below 1% of lower and higher boiling components. Such product was quenched and stabilized with about 30 kg./h. of a 2.5% aqueous hydroquinone solution supplied from the stabilizer container 15 through conduit 14, and then condensed in a cooling system composed of condenser 16 and gas cooler 17.

The condensate, which in all amounted to 198.3 kg./h., and which was drawn off from the separating vessel 18 consisted of 50 kg. of an oily phase containing 46.2 kg. of methyl methacrylate, 0.9 kg. of hydroquinone, 2.5 kg. of water and 0.3 kg. high and low boiling components (high boiling=ethyl methacrylate, $\beta$-hydroxy butyric acid methyl ester; low boiling=methanol, ethanol, acetone) and 148.3 kg. of an aqueous phase containing 2.0 kg. of methyl methacrylate and 146.3 kg. of water and very small quantities of hydroquinone and high and low boiling components. At the exhaust gas temperature of 30° C., 4 kg./h. of nitrogen and about 1 kg./h. of methyl methacrylate were drawn off as exhaust gas. The latter was condensed out in a further gas cooler 19. As a result, about 49.2 kg. of methyl methacrylate or 98.4% of the finely divided methyl methacrylate supplied were recovered.

30 kg./h. of the aqueous phase were drawn off from separating vessel 18 for the stabilizer solution and supplied to stabilizer container 15 over conduits 111 and 112. Hydroquinone is also supplied to vessel 15 over conduit 113. The remainder of the aqueous phase was purified by steam distillation and fractionation, either alone or together with the oily phase drawn off over conduit 114. An almost homogeneously distillation of 99.4 to 99.7% methyl methacrylate was already obtainable by a single fraction over a two plate column.

The crude cleavage product obtained was purer than a crude methyl methacrylate produced from acetone cyanhydrin after conversion to methacrylic acid amide and esterification. The product of the cleavage according to the invention therefore can also be subjected to the purification process of the acetone cyanhydrin-methyl methacrylate process so that a methyl methacrylate of usual commercial quality can be obtained without requiring additional apparatus and personnel costs.

I claim:

1. A process for the depolymerization of solid polymers selected from the group consisting of polybutadiene, polystyrene, polyformaldehyde and polymethyl methacrylate capable of pyrolytic cleavage to produce a monomer depolymerization product which comprises wind sifting and pyrolysing in a gas such solid polymer in a finely divided state having a grain size below 6 mm. at a temperature which is at least 100° C. over the depolymerization temperature of such polymer, the velocity of the gas used for wind sifting being such that cleavage of the smaller solid particles occurs at lower temperatures than the cleavage of the larger solid particles.

2. The process of claim 1 in which said wind sifting and pyrolysis is carried out at a temperature between 300° and 500° C. over the depolymerization temperature of such polymer.

3. The process of claim 2 in which the polymer is depolymerized finely divided polymethyl methacrylate of a grain size below 1.5 mm.

4. The process of claim 3 in which the wind sifting and pyrolysis is effected with the aid of superheated steam.

5. The process of claim 3 in which the finely divided polymethyl methacrylate is introduced downwardly into an upright depolymerization column intermediate its upper and lower ends while superheated steam is introduced upwardly into the lower end of such column at a temperature sufficient to provide the heat necessary for the pyrolysis and at a velocity sufficient to effect wind sifting of the polymethyl methacrylate being depolymerized in said column.

6. The process of claim 5 in which said polymethyl methacrylate is introduced into said column in admixture with an inert gas in a ratio of about 10:1 to 30:1 at a velocity which is 2 to 50 times that of the velocity of the superheated steam which is introduced.

7. A process according to claim 1 wherein the temperature is between 100° and 500° C. over the depolymerization temperature of such polymer.

8. A process according to claim 7 wherein the polymer is polymethyl methacrylate, the wind sifting is accomplished with the aid of a gaseous heat transfer agent having a velocity of 1 to 10 m./sec. and the velocity of the polymer at the time of injection is 2 to 50 times the velocity of the heat transfer agent.

9. A process according to claim 8 wherein the polymethyl methacrylate is introduced downwardly into an upright depolymerization column intermediate its upper and lower ends while superheated steam is introduced upwardly into the lower end of such column as the heat transfer agent at a temperature of about 790° C. to provide the heat necessary for the pyrolyses, the larger particles of polymethyl methacrylate are cleaved at a temperature of 550–790° C. in the lower regions of the cleavage column and the fined particles of polymethyl methacrylate are cleaved in the upper regions of the cleavage column at 400–500° C. because of the wind sifting action.

References Cited

UNITED STATES PATENTS

| 2,030,901 | 2/1936 | Strain | 260—486 |
| 2,383,921 | 8/1945 | Soday | 260—486 XR |
| 2,412,296 | 12/1946 | Shapiro | 260—486 |
| 3,228,973 | 1/1966 | O'Connor | 260—486 |

FOREIGN PATENTS

| 628,876 | 9/1949 | Great Britain. |

LORRAINE A. WEINBERGER, Primary Examiner

ALBERT P. HALLUIN, Assistant Examiner

U.S. Cl. X.R.

260—680, 669, 606